United States Patent [19]

Crumb et al.

[11] Patent Number: 4,503,677
[45] Date of Patent: Mar. 12, 1985

[54] MASTER CYLINDER

[75] Inventors: Donald A. Crumb, Mishawaka; Richard A. Zander, South Bend, both of Ind.

[73] Assignee: Allied Corporation, Morristown, N.J.

[21] Appl. No.: 380,203

[22] Filed: May 20, 1982

[51] Int. Cl.³ ............................................. B60T 11/20
[52] U.S. Cl. ........................................ 60/562; 60/589
[58] Field of Search ........................ 60/562, 589, 581

[56] References Cited

U.S. PATENT DOCUMENTS

| | | | |
|---|---|---|---|
| 3,060,691 | 10/1962 | Davis | 60/562 |
| 3,800,539 | 4/1974 | Le Marchand | 60/562 |
| 4,152,897 | 5/1979 | Falk | 60/592 |
| 4,161,105 | 7/1979 | Hagiwara | 60/589 |
| 4,249,381 | 2/1981 | Gaiser | 60/589 |
| 4,290,265 | 9/1981 | Maehara | 60/562 |
| 4,329,846 | 5/1982 | Gaiser | 60/562 |

FOREIGN PATENT DOCUMENTS

| | | | |
|---|---|---|---|
| 45232 | 2/1982 | European Pat. Off. | 60/562 |
| 2014890 | 2/1971 | Fed. Rep. of Germany | 60/589 |
| 69662 | 11/1954 | France | 60/562 |
| 887631 | 1/1962 | United Kingdom | 60/562 |

Primary Examiner—Abraham Hershkovitz
Attorney, Agent, or Firm—Larry J. Palguta; Ken C. Decker

[57] ABSTRACT

A master cylinder includes a housing (24) with a bore (26) receiving a pair of pistons (42, 48). The piston (48) engages seals (62, 64 and 66) to substantially define paths to a pair of pressure chambers (50, 52).

3 Claims, 1 Drawing Figure

U.S. Patent  Mar. 12, 1985  4,503,677
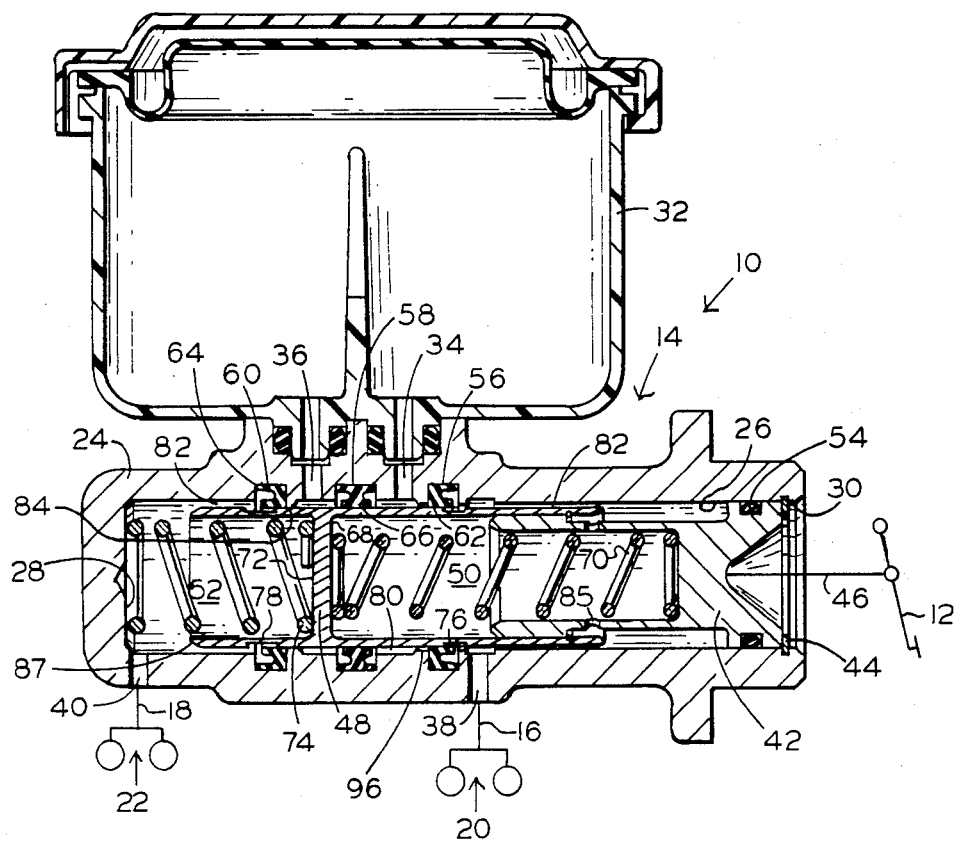

MASTER CYLINDER

This invention relates to a master cylinder which includes a pair of pressure chambers and a pair of pistons.

A master cylinder for communicating fluid pressure to a pair of brake circuits, the master cylinder comprising a housing having a bore therein receiving a pair of pistons, one of the pistons cooperating with the other piston to substantially define a primary pressure chamber therebetween, the other piston cooperating with a housing to substantially define a secondary pressure chamber, the pair of pressure chambers fluidly communicating with a reservoir via a pair of ports in the housing in a rest position, the pair of pistons being movable during braking to generate fluid pressure within the pair of pressure chambers, and sealing means between the housing and the other piston to fluidly isolate the pressure chambers.

In U.S. Pat. No. 4,249,381 (Gaiser) a displacement type master cylinder is disclosed with a sleeve to fixedly position a pair of lip seals within a housing bore. The secondary piston is provided with openings to communicate the primary chamber with its associated brake circuit. Within the housing bore, a plurality of seals are disposed to seal the pistons relative to the housing and the pressure chambers. Also, the compensation ports are disposed substantially at opposite ends of the secondary piston to increase the length of the master cylinder. It is desireable to design a master cylinder with fewer seals and a shorter length.

The master cylinder of the present invention is characterized in that said sealing means comprises at least three sealing members engageable with said other piston, two of said sealing members cooperating with said other piston to define passages permitting communication between said ports and said pressure chambers, respectively, said third sealing member sealingly engaging said housing and said other piston between said ports to isolate said passages, and said ports are disposed within said housing between said two sealing members to provide for a short housing length.

It is an advantage of the present invention that the three sealing members and the pair of ports are closely arranged within the housing bore to provide a short length for the master cylinder.

The invention will now be described with reference to the accompanying drawing which illustrates a brake system. With a master cylinder constructed in accordance with the present invention illustrated in cross section.

The brake system 10 includes a brake pedal 12, a master cylinder 14 and a pair of brake circuits 16 and 18 leading to brake assemblies 20 and 22. During a brake application, the pedal 12 is actuated to generate fluid pressure within the master cylinder 14 so that fluid pressure will be communicated through the circuits to the brake assemblies.

The master cylinder 14 includes a housing 24 defining a bore 26 extending from a bottom wall 28 to an opening 30. A reservoir 32 is carried by the housing such that a pair of compensation ports 34 and 36 communicate the reservoir 32 with the bore 26. Similarly, a pair of outlet ports 38 and 40 communicate the bore 26 with the brake circuits 16 and 18, respectively. A first or primary piston 42 is disposed within the bore 26 and assumes a rest position, as shown, in abutment with a snap ring 44. A connecting pin 46 extends between the pedal 12 and the first piston 42 to impart movement to the latter during braking. A second or secondary piston 48 is disposed within the bore 26 to cooperate with the first piston to substantially define a first or primary pressure chamber 50. Also, the secondary piston 48 cooperates with the wall 28 and the wall of bore 26 to substantially define a second or secondary pressure chamber 52. The first piston carries a seal 54 sealingly engaging the wall of bore 26 adjacent the snap ring 44.

In accordance with the invention, the wall of the bore 26 defines three recesses 56, 58 and 60 which are separated from each other by the ports 34 and 36. The recess 56 receives a U cup seal 62 facing the opening 30 and the recess 60 receives a U cup seal 64 facing the wall 28, while the recess 58 receives an X-shaped seal 66. Each of the seals 62, 64 and 66 sealingly engages the housing 24 and the secondary piston 48. The secondary piston is substantially H shaped with a first cavity 68 receiving the primary piston 42 and a first return spring 70. A second cavity 72 receives a second return spring 74. The secondary piston is formed with a pair of recesses or grooves 76 and 78 which can be either continuously formed around the periphery of the secondary piston or intermittently formed around the periphery of the secondary piston. In the rest position illustrated, the groove 76 is aligned substantially with the seal 62 and the groove 78 is substantially aligned with the seal 64.

The housing bore 26 is relieved between the recesses 56 and 60 to define a first radial space 80 between the housing 24 and the secondary piston 48. A second radial space 82 is provided between the wall of the bore 26 and the secondary piston outside the seals 62 and 64 so that lands 84 and 96 adjacent seals 62 and 64 provide for sliding engagement between the housing and secondary piston. The seals 62 and 64 are partially relieved on the radially inner surface. Therefore, a pair of fluid paths is established in the rest position between the reservoir 32 and the pressure chambers 50 and 52. Fluid from the reservoir 32 communicates with pressure chamber 50 via port 34, space 80, the partial relief for seal 62, groove 76 and space 82. An opening 85 on the first piston 42 cooperates with a loose sliding fit between the first piston 42 and the wall of cavity 68 to open the primary pressure chamber to the space 82. Similarly, fluid from the reservoir 32 communicates with the pressure chamber 52 via port 36, space 80, the partial relief for seal 64, groove 78 and space 82. In view of the seals 62 and 64 facing opposite directions, the X shaped seal 66 is not subjected to the fluid pressure generated during braking.

In order to insert the piston 48 into the bore 26 after the seals 62, 64 and 66 are positioned in their recesses, the leading edge of the secondary piston is provided with a cam taper 87 urging the seals into their recesses as the piston 48 moves past the seals.

During braking, the pedal 12 is actuated to impart movement to the primary piston 42, to eventually contract spring 70 and move the secondary piston 48. The groove 76 moves to the left of seal 62 to close communication between chamber 50 and reservoir 32. Simultaneously, the groove 78 moves to the left of seal 64 to close communication between chamber 52 and reservoir 32. Further movement of pistons 42 and 48 contracts the volume of the pressure chambers to generate fluid pressure therein, which, in turn, is communicated via outlet ports 38 and 40 to the brake circuits 16 and 18, respectively. Upon termination of braking, the return springs 74 and 70 bias the pistons to return to their rest position.

The master cylinder 14 requires only four seals (54, 62, 64 and 66) within the housing bore 26 and the seals 62, 64 and 66 are disposed adjacent the ports 34 and 36 to provide for a compact master cylinder.

We claim:

1. A master cylinder for communicating fluid pressure to a pair of brake circuits, the master cylinder comprising a housing having a bore therein receiving a pair of pistons, one of the pistons at an open end of the bore cooperating with the other piston to substantially define a primary pressure chamber therebetween, the other piston cooperating with the housing to substantially define a secondary pressure chamber adjacent a bottom wall of the bore, the pair of pressure chambers fluidly communicating with a reservoir via a pair of ports in the housing in a rest position, the pair of pistons being movable during braking to generate fluid pressure within the pair of pressure chambers, and sealing means between the housing and the other piston to fluidly isolate the pressure chambers, characterized in that said sealing means comprises at least three sealing members engageable with said other piston, two of said sealing members cooperating with said other piston to define passages permitting communication between said ports and said pressure chambers, respectively, said third sealing member sealingly engaging said housing and said other piston between said ports to fluidly isolate said passages, and said ports are disposed within said housing between said two sealing members and separated by said third sealing member to provide for a short housing length.

2. The master cylinder of claim 1 in which said other piston is substantially H-shaped in cross section to define oppositely facing cavities, one of said cavities receiving said one piston, the other of said cavities receiving a return spring, and said other piston including a pair of recesses aligned with said two sealing members in the rest position to define said passages with said two sealing members.

3. A master cylinder comprising a housing with a bore receiving a pair of pistons to define a pair of pressure chambers, the pair of pressure chambers communicating with a reservoir in a rest position and the pair of pistons being moveable during braking to close communication with the reservoir and generate fluid pressure within the pair of pressure chambers, one of the pair of pistons being disposed between a bottom wall of the bore and the other piston, the one piston cooperating with sealing means fixedly disposed within the housing bore to define fluid paths extending from separate cavities within the reservoir to the pair of pressure chambers, respectively, in the rest position, the sealing means includes a sealing ring sealingly separating the fluid paths from the separate cavities and additional seals sealingly isolating the sealing ring from the fluid pressure generated during braking the housing bore cooperates with the one piston to define radial clearances at opposite ends of the one piston and these radial clearances provide for fluid communication between the reservoir the pair of pressure chambers in the absence of radially-extending holes through the one piston.

* * * * *